(12) United States Patent
Ryu et al.

(10) Patent No.: US 6,649,675 B1
(45) Date of Patent: Nov. 18, 2003

(54) METALLIC GLOSS IMAGE COMPOSITION AND METHOD FOR FABRICATING THE SAME

(75) Inventors: Seung-Min Ryu, Kyonggi-do (KR); Seung-Soon Jang, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 63 days.

(21) Appl. No.: 09/619,714

(22) Filed: Jul. 19, 2000

(30) Foreign Application Priority Data

Jul. 19, 1999 (KR) ........................................ 1999-29099
Mar. 13, 2000 (KR) ........................................ 2000-12380

(51) Int. Cl.$^7$ .............................. C08K 5/34; C08K 5/16; C08K 5/17; C08K 5/33; C08K 3/20
(52) U.S. Cl. ...................... 524/104; 524/189; 524/207; 524/210; 524/236; 524/238; 524/291; 524/259; 524/366; 524/385; 524/386; 524/389; 525/178; 525/182; 525/185; 525/186; 525/188; 525/189; 252/363.5; 252/400; 106/31.97
(58) Field of Search .............................. 252/400, 363.5; 523/205; 524/379, 104, 189, 207, 210, 236, 238, 241, 259, 366, 385, 386, 389; 106/31.97; 525/178, 182, 185, 186, 188, 189

(56) References Cited

U.S. PATENT DOCUMENTS 5,037,475 A * 8/1991 Chida et al. ................. 106/403
5,474,603 A * 12/1995 Miyashita et al. ......... 106/25 R
5,637,438 A * 6/1997 Maerz et al. ............... 430/253

* cited by examiner

*Primary Examiner*—Kriellion A. Sanders
(74) *Attorney, Agent, or Firm*—Robert E. Bushnell, Esq

(57) ABSTRACT

A metallic gloss image composition including a hydromorphic solvent and a polsulfurnitride derivative dissolved in the hydromorphic solvent. The polysulfurnitride derivative has the following formula: R1—(—S=N—)$_n$—R2. Instead of the hydromorphic solvent, a thermoplastic renis formed by polymerization of monomers can be used to obtain the metallic gloss image composition.

42 Claims, No Drawings

METALLIC GLOSS IMAGE COMPOSITION AND METHOD FOR FABRICATING THE SAME

CLAIM OF PRIORITY

This application makes reference to, incorporates the same herein, and claims all rights accruing thereto under 35 U.S.C. §119 through our patent applications entitled Metallic Luster Revelation Composite Containing Organic Synthetic Metallic Group For Use of Imaging Material earlier filed in the Korean Industrial Property Office on the 19$^{th}$ day of July 1999 and there duly assigned Serial No. 29099/1999 and entitled Metallic Gloss Image Composition and Method For Fabricating The Same earlier filed in the Korean Industrial Property Office on the 13$^{th}$ day of March 2000 and there duly assigned Serial No. 12380/2000.

BACKGROUND OF THE INVENTION

1. Field of the Invention

The present invention relates generally to an image composition such as ink or toner used in an image formation process by office automation apparatus, and more particularly, to a metallic gloss image composition with organic synthetic metallic material that allows particle size to be easily controlled in nonhomogeneous solvent and that provides a superior dispersion, is used as metallic gloss derivative. The present invention also relates to a metallic gloss image composition capable of solving aggregation of metallic gloss derivative, as well as to a method for fabricating a metallic gloss image composition.

2. Background Art

Generally, image composition such as ink or solid toner is used to transfer a printing image onto the printing paper in office automation (OA) apparatus such as ink jet printer, laser printer, copier and facsimile machine. The transfer image on the printing paper is interfaced with the user. To this end, the quality of the image composition has a direct relation to the quality of the OA apparatus. So, to enhance the quality of the image composition, many efforts have been performed. As one type of such the efforts, there is provided the use of a metal-containing inorganic pigment to allow the printing image to have the metallic gloss.

One technique for obtaining the metallic gloss to printings or paintings, is shown, for example, in the U.S. Pat. No. 5,037,475 entitled Colored Metallic Pigment. Method For The Production of Same And Products Containing Same, U.S. Pat. No 5,474,603 entitled Aqueous Metallic Ink For Ball-point Pen and U.S. Pat.No. 5,637,438 entitled Photosensitive Material And Production of Metal Colored Images Utilizing Pearl Luster Pigment. These patents mention a metal-containing inorganic pigment used in inducing the revelation of the metallic gloss.

We have found however, the metal-containing inorganic pigment has several shortcomings in directly applying them to the ink or toner of OA machines.

Generally, the conventional ink or toner uses an inhomogeneous solvent. In spite of this general condition, the aforementioned patents '475, '603 and '438 have a large difficulty in controlling the particle size in the inhomogeneous solvent. So, it is almost impossible to use the metal-containing inorganic pigment as one component of the image composition.

Moreover, the patents '475, '603 and '438 have a shortcoming in that the dispersion property is not good.

In order to solve this dispersion property problem, a technique adding an additional dispersion stabilizer to the inhomogeneous solvent increases the viscosity of the solvent to a large degree by the action of the dispersion stabilizer, which causes another problems in that ink or toner is not injected due to the aggregation or precipitation of them.

Also, the metal-containing inorganic pigment disclosed in the patents '475, '603 and '438 has a very weak affinity to the human body and the environment.

To this end, the metal-containing inorganic pigment can be used for restricted purposes, for example, source for ball-point pen. Accordingly, we have discovered that there is a need for an improved image composition capable of revealing the metallic gloss without the aforementioned shortcomings be developed.

SUMMARY OF THE INVENTION

It is therefore, an object of the present invention to provide an improved image formation process, composition and method of fabricating the composition.

It is another object to provide an image formation process, composition and method of fabricating the composition able to furnish printed images with metallic gloss revelation.

It is yet another object to provide an image formation process, composition and method of fabricating the composition using organic synthesis metallic material.

It is still another object to provide an image formation process, composition and method of fabricating the composition that enhances the quality of printing image by allowing an image composition for OA machines, such as ink or toner to have metallic gloss revelation capability using organic synthesis metallic material instead of inorganic pigment.

It is still yet another to solve the problem attributable to aggregation of metallic gloss derivative contained in printing material.

It is a further object to minimize contamination of human body and environmental pollution.

These and other objects may be attained in the practice of the principles of the present invention with a metallic gloss image composition that is provided in an image forming composition. The metallic gloss image composition may be made with a hydromorphic solvent, and a polysulfurnitride derivative dissolved in the hydromorphic solvent, with the polysulfurnitride derivative a formula of R1—(—S═N—)$_n$—R2, where R1 and R2 are a substituent group and n is a polymerized degree of a sulfurnitride polymer. Preferably, each of the R1 and R2 is one selected from the group of hydrogen, $C_1$–$C_{30}$ aliphatic compound, $C_1$–$C_{30}$ aliphatic compound having at least one functional group, $C_1$–$C_{30}$ hetero compound, hetero aliphatic compound having at least one functional group, $C_1$–$C_{30}$ cyclo aliphatic compound, $C_1$–$C_{30}$ cyclo aliphatic compound having at least one functional group, $C_1$–$C_{30}$ aromatic compound, $C_1$–$C_{30}$ aromatic compound having at least one functional group, polyoxyethylene group, polyoxyethylene having at least one functional group, polyoxypropylene group, polyoxypropylene group having at least one functional group, copolymer of oxyethylene group and oxypropylene group and copolymer of oxyethylene group having at least one functional group and oxypropylene group.

According to another aspect of the invention, a metallic gloss image composition comprises may be formed with a thermoplastic resin formed by polymerization of a plurality of monomers; and a polysulfurnitride derivative mixed with said thermoplastic resin, with the polysulfurnitride derivative having a formula of R1—(—S=N—)$_n$—R2, wherein R1 and R2 are a substituent group and n is a polymerized degree of a sulfurnitride polymer. Preferably, the monomer is one selected from the group consisting of styrenic compound monomer, acrylic acid monomer, methacrylic monomer, acrylic acid derivatives monomer, methacrylic acid derivatives monomer, a mixture of styrenic compound monomer and acrylic acid monomer, a mixture of styrenic compound monomer and methacrylic acid monomer, a mixture of styrenic compound monomer and acrylic acid derivatives monomer, a mixture of styrenic compound monomer and methacrylic acid derivatives monomer, a mixture of acrylic acid monomer and methacrylic acid monomer, a mixture of acrylic acid monomer and acrylic acid derivatives monomer, a mixture of acrylic acid monomer and methacrylic acid derivatives monomer, a mixture of methacrylic acid monomer and methacrylic acid derivatives monomer and a mixture of acrylic acid derivatives monomer and methacrylic acid derivatives monomer.

DETAILED DESCRIPTION OF THE INVENTION

Hereinafter, preferred embodiments of the metallic gloss image composition are described.

Embodiment 1

A metallic gloss image composition according to one embodiment of the invention includes a hydromorphic solvent; and a polysulfurnitride derivative dissolved in the hydromorphic solvent. The polysulfurnitride derivative has the following formula:

R1—(—S=N—)$_n$—R2    (I)

where R1 and R2 are a substituent group and n is a degree of polymerization of the sulfurnitride polymer.

As shown in the formula (I), the polysulfurnitride derivative has a structure in which two substituent groups of R1 and R2 are coupled to the sulfurnitride polymer placed at the center. At this time, the sulfurnitride polymer has a structure in which sulfur and nitrogen are alternatively arranged, so-called, "conjugate structure". Here, noncovalent electron pair contained in the nitrogen atom is delocalized in polymer chains, thereby allowing the finally formed polysulfurnitride derivative to have the metallic gloss similar to the reflection on the surface of metal.

By the action of the sulfurnitride polymer, the polysulfurnitride derivative provides printing images with the metallic gloss.

Here, it is noted that the substituent groups of R1 and R2 should be coupled to the sulfurnitride polymer at both sides of the sulfurnitride polymer. If only the sulfurnitride polymer is used as the image composition without bonding the substituent groups to the sulfurnitride polymer, revelation of the metallic gloss can be secured to some degree but satisfactory solution chracteristic and dispersion characteristic can not be obtained. In other words, the sulfurnitride polymer alone is not proper for the use of the image composition.

Here, each of the substituent groups R1 and R2 is one selected from the group consisting of hydrogen, $C_1$–$C_{30}$ aliphatic compound, $C_1$–$C_{30}$ aliphatic compound having at least one functional group, $C_1$–$C_{30}$ hetero compound, hetero aliphatic compound having at least one functional group, $C_1$–$C_{30}$ cyclo aliphatic compound, $C_1$–$C_{30}$ cyclo aliphatic compound having at least one functional group, $C_1$–$C_{30}$ aromatic compound, $C_1$–$C_{30}$ aromatic compound having at least one functional group, polyoxyethylene group, polyoxyethylene having at least one functional group, polyoxypropylene group, polyoxypropylene group having at least one functional group, copolymer of oxyethylene group and oxypropylene group and copolymer of oxyethylene group having at least one functional group and oxypropylene group.

Also, the functional group contained in the substituent groups R1 and R2 is one selected from the group consisting of amino group, imine group, amidino group, amide group, hydrazine group, hydrazone group, haride group, hydroxy group, nitro group, cyano group, thiocyano group, thiol group, carboxyl group, alkali salt of carboxylic acid, phosphoric acid group and alkali salt of phosphoric acid.

In formula(I), the character "n" designates a degree of the polymerization. The n has a range of 40 to 40,000, preferably 400 to 4,000. If the n is larger than 40,000, the molecular size of the sulfurnitride polymer becomes larger than needed and the sulfurnitride polymer is spontaneously crystallized, resulting in considerable lowering of the dispersion. While if the n is smaller than 40, the molecular size of the sulfurnitride polymer becomes smaller than needed and thereby the polysulfurnitride derivative as finally formed may not reveal the metallic gloss.

To resolve the aforementioned shortcomings, the present invention allows the degree of the polymerization of the sulfurnitride polymer, "n" to have such the range of 40 to 40,000.

At this time, the polysulfurnitride derivative is dissolved in a content of 1.0 to 10.0% by weight in the hydromorphic solvent. If the dissolved amount of the polysulfurnitride derivative is over 10.0 wt %, the polysulfurnitride derivative is non-uniformly dispersed in the hydromorphic solvent. While if the dissolved amount of the polysulfurnitride derivative is below 1.0 wt %, the polysulfurnitride derivative does not reveal the metallic gloss. Therefore, the dissolved amount of the polysulfurnitride derivative is restricted in the range of 1.0 to 10.0% by weight. The following structure formula (II) shows an substantial example of polysulfurnitride derivative which is one component of the metallic gloss composition.

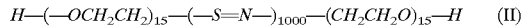

H—(—OCH$_2$CH$_2$)$_{15}$—(—S=N—)$_{1000}$—(CH$_2$CH$_2$O)$_{15}$—H    (II)

As shown in the structure given by formula (II), two substituent groups are coupled to sulfurnitride polymer at both sides of the sulfurnitride polymer. The sulfurnitride polymer has the degree of m polymerization of 40 to 40,000, perferably 1,000.

As previously described, non-covalent electron pair contained in the nitrogen atoms of the sulfurnitride polymer is delocalized in polymer chains, thereby allowing the finally formed polysulfurnitride derivative to have the metallic gloss similar to the reflection occurred in the surface of the metal. Meanwhile, as the polysulfurnitride derivative dissolved in the hydromorphic solvent, water can be used. Since water possesses a relatively strong hydrogen bondcapability, it not only maintains affinity with respect to the printing paper but smoothly performs a rols as carrier rapidly carrying the polysulfurnitride derivative.

In addition to the polysulfurnitride derivative, alcohol compound can be further mixed with the hydromorphic solvent. This alcohol compound possesses the superior hygroscopicity into the printing paper. So, the alcohol compound acts as carrier that allows the polysulfurnitride derivative to be smoothly moved into the printing paper. Also, since the alcohol compound can maintain the volatility greater than water, it shortens the drying time taken in drying the image composition transferred onto the printing paper.

This alcohol compound is selected from the group consisting of ethanol, isopropanol, butanol and pentanol and is mixed in a content of about 1.0 to 20.0% by weight with the hydromorphic solvent. If the mixed amount of the alcohol compound is over 20.0 wt %, the drying time of the K image composition is too short, which acts as a factor that the nozzle of OA apparatus, for example, the ink jet printer is easily stopped. If, on the contrary, the mixed amount of the alcohol compound is below 1.0 wt %, the drying time of the image composition is too long and the printed image is blurred, resulting in lowering the printing quality.

To prevent these shortcomings, the added amount of the alcohol compound is restricted in a range of 1.0 to 20.0% by weight. Here, the alcohol compound does not cause any problem in the solution state because it has a superior reactivity on water. The alcohol compound has a property in that the hygroscopicity of the alcohol compound is very different from that of the water. Then, when the alcohol compound is mixed with the water without an additional processing and a compound of the alcohol compound and the water is transferred onto the printing paper, a problem in that the polysulfurnitride derivative contained in the compound is not uniformly fixed to the surface of the printing paper may occur.

To prevent this problem in advance, a glycol compound hygroscopic agent is further added to the aforementioned hydromorphic solvent. The glycol compound hygroscopic agent may use two or more hydroxyl groups and maintains the good affinity to both of the water and the alcohol compound. So, the glycol compound is further added to the hydromorphic solvent mixed with the alcohol compound, the polysulfurnitride derivative can be uniformly fixed to the surface of the printing paper. In addition, the glycol compound hygroscopic agent has a volatility lower than the compound of the water and the alcohol compound. Therefore, when the glycol compound hygroscopic agent is further added, the problem that the nozzle of the ink jet printer is stopped during a printing operation can be solved.

The glycol compound hygroscopic agent may be one selected from the group consisting of ethylene glycol, propylene glycol, 1,3-butanediol, 1,4-butanediol, 1,5-pentanediol, 2-butene-1,4-diol, 2-methyl-2-pentanediol. The glycol compound hygroscopic agent is mixed in a content of 0.1 to 20.0% by weight with the hydromorphic solvent. If the mixed amount of the glycol compound hygroscopic agent is over 20.0 wt %, the viscosity of the image composition largely increases, which instabilizes the injection of the image composition in the ink jet printer and delays the drying time.

Meanwhile, if the mixed amount of the glycol compound hygroscopic agent is below 1.0 wt %, problems that the nozzle is blocked and the polysulfurnitride derivative is not uniformly fixed to the printing paper may occur. To prevent these shortcomings, the added amount of the glycol compound hygroscopic agent is restricted in a range of 1.0 to 20.0% by weight.

The hydromorphic solvent selectively may be formed with a pyrrolidone compound storage stabilizer in addition to the aforementioned polysulfurnitride derivative, alcohol compound and glycol compound hygroscopic agent. The pyrroolidone compound storage stabilizer helps to maintain a normal liquid state during the storage period without occurrence of precipitation.

Any one of 2-pyrrolidone and N-methyl-2-pyrrolidone can be selectively used as the pyrrolidone compound storage stabilizer. The pyrrolidone compound storage stabilizer is mixed in a content of 0.1 to 10.0% by weight with the hydromorphic solvent. If the mixed amount of the pyrrolidone compound storage stabilizer is over 10.0 wt %, the surface tension of the image composition is largely lowered and thereby the image composition is deeply permeated into the printing paper, resulting in a problem that the printed image does not have definite colors.

Meanwhile, if the mixed amount of the pyrrolidone compound storage stabilizer is below 0.1 wt %, it causes a problem that precipitation is generated in the composition. To prevent these shortcomings, the added amount of the pyrrolidone compound storage stabilizer is restricted in a range of 0.1 to 10.0% by weight. In addition to the pyrrolidone compound storage stabilizer, polyoxide compound surfactant can be further added to the hydromorphic solvent. The polyoxide compound surfactant controls the whole surface tension of the image composition to stabilize the injection capability of the image composition.

Moreover, the polyoxide compound surfactant forms a similar molecular structure with the glycol compound hygroscopic agent to suppress the volatility of the image composition. To this end, by the use of the polyoxide compound surfactant, it can be prevented that a problem that the nozzle of the ink jet printer is dried and is easily blocked.

As the polyoxide compound surfactant, any one of polyethyleneoxide and polypropyleneoxide can be selectively used. The polyoxide compound surfactant is mixed in a content of 0.1 to 1.0% by weight with the hydromorphic solvent. If the mixed amount of the polyoxide compound surfactant is over 1.0 wt %, the whole viscosity of the image composition largely increases over needed and thereby it becomes difficult to inject the image composition.

Meanwhile, if the mixed amount of the polyoxide compound surfactant is below 0.1 wt %, it causes a problem that no roles as the surfactant precipitation can be performed. To prevent these shortcomings, the added amount of the polyoxide compound surfactant is restricted in a range of 0.1 to 1.0% by weight. Preferably, in addition to the pyrrolidone compound storage stabilizer and the polyoxide compound surfactant, viscosity modifier can be further added to the hydromorphic solvent.

The viscosity modifier controls the surface tension of the image composition to stabilize the injection capability of the image composition. As the viscosity modifier, there can be used one selected from the group consisting of polyvinylalcohol, casein and carboxymethylcellulose. The viscosity modifier is mixed in a content of 0.1 to 5.0% by weight with said hydromorphic solvent. If the mixed amount of the viscosity modifier is over 5.0 wt %, the whole viscosity of the image composition largely increases over needed and thereby it becomes difficult to inject the image composition.

Meanwhile, if the mixed amount of the viscosity modifier is below 0.1 wt %, it causes a problem that a large amount of image composition is suddenly injected. Thus, the added amount of the viscosity modifier is restricted in a range of 0.1 to 5.0% by weight.

The following table 1 shows examples of the aforementioned metallic gloss compositions. As shown in table 1, various kinds of image compositions can be prepared depending on the necessity. As previously described, the polysulfurnitride derivative acts as the metallic gloss provider providing the printed image with the metallic gloss and has an added amount in a range of 1.0 to 10.0 wt %. In the below examples, the added amount of the polysulfurnitride is selected in a range from 1.0 to 2.5.

TABLE 1

*unit: wt %

| Constituent | Added amount 1 | Added amount 2 | Added amount 3 | Added amount 4 |
|---|---|---|---|---|
| Polysulfurnitride derivative | 2.5 | 2.0 | 1.5 | 1.0 |
| Ethanol | 5.0 | 5.0 | 5.0 | 5.0 |
| Ethylene glycol | 10.0 | 10.0 | 10.0 | 10.0 |
| N-methyl-2-pyrrolidone | 5.0 | 5.0 | 5.0 | 5.0 |
| Polyethylene oxide | 0.2 | 0.5 | 0.5 | 0.5 |
| Polyvinylalcohol | 0.2 | 0.3 | 0.4 | 0.5 |
| Water | 76.5 | 77.2 | 77.6 | 78.0 |

The ethanol that is one of the alcohol compound acts as a carrier carrying the polysulfurnitride derivative together with the water and has an added amount in a range of 0.1 to 20.0 wt %, for example, 5 wt %. The ethanol glycol that is one of the glycol compound hygroscopic agent acts as a fixing agent uniformly fixing the polysulfurnitride derivative into the surface of the printing paper and has an added amount in a range of 0.1 to 20.0 wt %, for example, 10.0 wt %.

Also, the N-methyl-2-pyrrolidone that is one of the pyrrolidone compound storage stabilizer acts as a preventive agent preventing the precipitation of the finally formed image composition in advance and has an added amount in a range of 0.1 to 10.0 wt %, for example, 5.0 wt %. The polyethylene oxide that is one of the polyoxide compound surfactant acts as a stabilizer stabilizing the injecting capability of the finally formed image composition and has an added amount in a range of 0.1 to 1.0 wt %, for example, 0.5 wt %. The polyvinylalcohol that is one of the viscosity modifier performs a role controlling the surface tension of the finally formed image composition and has an added amount in a range of 0.1 to 5.0 wt %, for example, 0.2 to 0.5 wt %.

The following table 2 shows measured results of characteristics of the image compositions having the compositions of the table 1. In table 2, comp. 1 designates an image composition having the added amount 1, comp. 2 designates an image composition having the added amount 2, comp. 3 designates an image composition having the added amount 3 and comp. 4 designates an image composition having the added amount 4 in table 1.

Referring now to table 2, the image compositions have the viscosity in a range of 1.27 cP to 1.30 cP that pertains to the normal value and the surface tension in a range of 42.2 dyne/cm to 43.1 dyne/cm that pertains to the normal value. Next, to evaluate the storage stability, 100 ml of the image composition was contained in a heat resisting glass container of which the inlet was sealed. Thereafter, the sealed container was stored for two weeks in a thermostatic chamber. With image compositions prepared through the above described procedure, a printing work was performed.

As shown in table 2, it is confirmed that normal images are formed without the occurrence of abnormal phenomena such as not-printed or deterioration. Next, to evaluate the blur of the image composition, an image with different colors was many times repeatedly printed and then the blur is observed by a microscope. As a result, as shown in table 2, it was observed that the image compositions did not generate the blur problem in that images having different colors are changed into one color image by the blur.

Next, to evaluate the optical density, optical densities of printed images formed with the image compositions of the invention were measured by a optical density measuring apparatus made by Macbeth Company, product model TR-1224. As a result, as shown in table 2, each of the image compositions shows superior optical densities of 0.9 to 1.0 or more.

Next, to evaluate an optical density variation by the water, a printed image formed by the image compositions of the invention was dipped in the water and the dipped image was then dried. The optical density variation was measured by the above described optical density measuring apparatus. As shown in table 2, it was observed that each of the image compositions has a superior optical density variation less than 10%.

Next, to evaluate an optical density variation by light, ultraviolet ray having a wavelength of 254 nm is irradiated onto a printed image formed by the image compositions of the invention for two weeks. Likewise, the optical density variation was measured by the above described optical density measuring apparatus. As a result, as shown in table 2, each of the image compositions shows a superior optical density variation less than 5%.

TABLE 2

| Items | Comp. 1 | Comp. 2 | Comp. 3 | Comp. 4 |
|---|---|---|---|---|
| Viscosity (cP) | 1.30 | 1.29 | 1.29 | 1.27 |
| Surface tension (dyne/cm) | 43.1 | 42.8 | 42.5 | 42.2 |
| Storage stability | Good | Good | Good | Good |
| Blur | None | None | None | None |
| Optical density | 1.0 or more | 1.0 or more | 1.0 or more | 0.9–1.0 |
| Optical density variation by water | Less than 10% | Less than 10% | Less than 10% | Less than 10% |
| Optical density variation by light | Less than 5% | Less than 5% | Less than 5% | Less than 5% |

Thus, the polysulfurnitride derivative can easily control the particle size in inhomogeneous solvent compared with the conventional metal-containing inorganic pigment. Also, it has a superior dispersion. Therefore, by the use of the polysulfurnitride derivative as a main component in the image composition, good metallic gloss can be provided in the printed image and particle size control and aggregation problems cane be solved. Moreover, the polysulfurnitride has a relatively smaller contamination degree compared with the conventional metal-containing inorganic pigment. Therefore, by the use of the polysulfurnitride derivative as a main component in the image composition, printed image having the good metallic gloss can be obtained and the contamination of the human body and the environmental pollution can be prevented.

Embodiment 2

A metallic gloss image composition according to another embodiment of the invention includes a thermoplastic resin; and a polysulfurnitride derivative dissolved in the thermoplastic resin. Likewise the first embodiment, the polysulfurnitride derivative has the aforementioned formula (I). The image composition can be used in office automation systems, for example, toner for laser printer. As shown in the formula (I), the polysulfurnitride derivative has a structure in which two substituent groups of R1 and R2 are coupled to the sulfurnitride polymer placed at the center.

The sulfurnitride polymer also has a structure in which sulfur and nitrogen are alternatively arranged, so-called, "conjugate structure". Here, noncovalent electron pair contained in the nitrogen atom is delocalized in polymer chains, thereby allowing the finally formed polysulfurnitride derivative to have the metallic gloss similar to the reflection on the surface of metal.

The polysulfurnitride derivative provides printing images with the metallic gloss due to the action of the sulfurnitride polymer. Like the first embodiment, each of the substituent groups R1 and R2 is one selected from the group consisting of hydrogen, $C_1$–$C30$ aliphatic compound, $C_1$–$C30$ aliphatic compound having at least one functional group, $C_1$–$C30$ hetero aliphatic compound, hetero aliphatic compound having at least one functional group, $C_1$–$C30$ cyclo aliphatic compound, $C_1$–$C30$ cyclo aliphatic compound having at least one functional group, $C_1$–$C30$ aromatic compound, $C_1$–$C30$ aromatic compound having at least one functional group, polyoxyethylene group, polyoxyethylene having at least one functional group, polyoxypropylene group, polyoxypropylene group having at least one functional group, copolymer of oxyethylene group and oxypropylene group and copolymer of oxyethylene group having at least one functional group and oxypropylene group.

Also, the functional group contained in the substituent groups R1 and R2 is one selected from the group consisting of amino group, imine group, amidino group, amide group, hydrazine group, hydrazone group, haride group, hydroxy group, nitro group, cyano group, thiocyano group, thiol group, carboxyl group, alkali salt of carboxylic acid, phosphoric acid group and alkali salt of phosphoric acid. The character "n" designating the degree of the polymerization, also has a range of 40 to 40,000, preferably 400 to 4,000.

Meanwhile, as previously described, the polysulfurnitride derivative according to another embodiment of the invention is mixed with the thermoplastic resin which is formed by the polymerization of monomers, thereby forming a metallic gloss image composition.

In this case, the monomer is selected from the group consisting of styrenic compound monomer, acrylic acid monomer, methacrylic monomer, acrylic acid derivatives monomer, methacrylic acid derivatives monomer, a mixture of styrenic compound monomer and acrylic acid monomer, a mixture of styrenic compound monomer and methacrylic acid monomer, a mixture of styrenic compound monomer and acrylic acid derivatives monomer, a mixture of styrenic compound monomer and methacrylic acid derivatives monomer, a mixture of acrylic acid monomer and methacrylicacidmonomer, amixture of acrylic acid monomer and acrylic acid derivatives monomer, a mixture of acrylic acid monomer and methacrylic acid derivatives monomer, a mixture of methacrylic acid monomer and methacrylic acid derivatives monomer and a mixture of acrylic acid derivatives monomer and methacrylic acid derivatives monomer. Also, the styrenic compound monomer may be selected from the group consisting of styrene, vinyl toluene and α-methystyrene. The acrylic acid derivative monomer may be selected from the group consisting of methyl acrylate, ethyl acrylate, propyl acrylate, 2-ethyl hexyl acrylate and dimethyl aminoethyl acrylate.

The methacrylic acid derivatives monomer is selected from the group consisting of methyl methacrylate, ethyl methacrylate, propyl methacrylate and butyl methacrylate. Hereinafter, the metallic gloss image composition having the above constitution is described. First, a suspension stabilizer is added to a hydromorphic dispersant, for example, water. Thereafter, the hydromorphic dispersant mixed with the suspension stabilizer is agitated in a velocity of 5,000 rpm for five minutes.

The suspension stabilizer makes a role in allowing the thermoplastic resin formed by the polymerization of the mononmers to be more smoothly dispersed in the hydromorphic dispersant.

The suspension stabilizer is selected from the group consisting of sulfates compound stabilizer, carbonates compound stabilizer, phosphate compound stabilizer, metal oxides compound stabilizer and metal hydroxides compound stabilizer. Also, as the sulfates compound stabilizer, any one of barium sulfate or calcium sulfate can be selected, as the phosphate compound stabilizer, calcium phosphate can be selected and as the metal oxides compound stabilizer, any one of aluminum oxide and titanium oxide can be selected and as the metal hydroxides compound stabilizer, any one among aluminum hydroxide, magnesium hydroxide and ferric hydroxide can be selected.

Here, the suspension stabilizer is mixed in a content of 0.1 to 2.0% by weight with the hydromorphic dispersant. If the mixed amount of the suspension stabilizer is over 2.0 wt %, a problem that the viscosity of the hydromorphic dispersant abruptly increases mayoccur. While if the mixed amount of the suspension stabilizer is less than 0.1 wt %, the stability of the whole polymerization reaction system is damaged and thereby a problem such as the aggregation may occur during the polymerization reaction. To prevent this aggregation problem, the added amount of the suspension stabilizer is restricted in the range of 0.1 to 2.0 wt %.

After the agitating step of the hydromorphic dispersant and the suspension stabilizer is completed, the monomers are added to the hydromorphic dispersant and is agitated in a velocity of 5,000 rpm for five minutes, thereby dispersing the monomers in the hydromorphic dispersant. Likewise, the monomers are any one kind among the aforementioned monomers. These monomers is polymerized by a heating process to be described later, to form the thermoplastic resin.

At this time, the momomer is mixed in a content of 15.0 to 30.0% by weight with the hydromorphic dispersant. If the added amount of the hydromorphic dispersant is over 30.0 wt %, the created amount of the thermoplastic resin is too much, which influences the polysulfurnitride derivative. As a result, a problem that the finally formed image composition does not reveal the metallic gloss may occur. Also, when the monomer is mixed in a content less than 15.0 wt % with the hydromorphic dispersant, the created amount of the thermoplastic resin is too small and thereby the finally formed image composition may not be completely fixed to the printing paper. To resolve these problems, the added amount of the monomer is restricted in the rage of 15.0 to 30.0 wt %.

Meanwhile, while the dispersion process of the monomers is performed, the polysulfurnitride derivative is added to the hydromorphic dispersant. The polysulfurnitride derivative is mixed with the thermoplastic resin formed by the polymerization of the monomer, thereby allowing the printed image to have metallic gloss. At this time, the polysulfurnitride derivative is mixed in a content of 1.0 to 10.0% by weight with the hydromorphic dispersant. If the added amount of the polysulfurnitride derivative is over 10.0 wt %, the polysulfurnitride derivative may be non-uniformly dispersed. Also, when the polysulfurnitride derivative is mixed in a content less than 1.0 wt % with the hydromorphic dispersant, the polysulfurnitride derivative may not reveal the metallic gloss.

To resolve these problems, the added amount of the polysulfurnitride derivative is restricted in the rage of 1.0 to 10.0 wt %. Meanwhile, at a similar time to when the polysulfurnitride derivative is added to the hydromorphic dispersant, a polymerizati on initiator is further added to the hydromorphic dispersant. The polymerization initiator helps to start a smooth polymerization reaction of the aforementioned monomers. Persulfates compound polymerization initiator or azo compound polymerization initiator can be used for the polymerization initiator.

Also, as the persulfates compound polymerization initiator, potassium persulfate or ammonium persulfate can be used. The azo compound polymerization initiator is selected from the group consisting of 4,4-azobis(4-cyanovaleric acid)), 2,2-azobis(2-amidinopropane) bihydrochloride) and 2,2-azobisisobutylonitrilie. Here, the polymerization initiator is mixed in a content of 0.1 to 5.0 wt % with the hydromorphic dispersant. If the added amount of the polymerization initiator is over 5.0 wt %, a number average molecular weight of the polymerization-completed thermoplastic resin becomes too small, the fixation may be lowered. Also, when the added amount of the polymerization initiator is mixed in a content less than 0.1 wt % with the hydromorphic dispersant, the fabrication yield of the image composition is considerably lowered.

To resolve these problems, the added amount of the polymerization initiator is restricted in the rage of 0.1 to 5.0 wt %. At a similar time to when the polysulfurnitride derivative and the polymerization initiator are added to the hydromorphic dispersant, a parting agent is further added to the hydromorphic dispersant. When the image composition having the above-described constitution is applied to laser printers, the image composition is activated by high temperature and voltage supplied from the laser printer and is fixed to the printing paper. Then, when the printing work is performed without a specific processing, the image composition is dissolved by the high temperature and voltage, the dissolved material may be attached to a part of the laser printer, for instance, the roller.

To prevent this attaching problem, the parting agent is in advance added to the hydromorphic dispersant, thereby allowing the finally formed image composition to be rapidly fixed to the printing paper. The parting agent is one selected from the group consisting of polyethylene, polypropylene, polybutylene and paraffin wax and is mixed in a content of 0.1 to 10.0% by weight with the hydromorphic dispersant solvent. If the added amount of the parting agent is over 10.0 wt %, the finally formed printing image may be crushed. Also,when the added amount of the parting agent is mixed in a content less than 0.1 wt % with the hydromorphic dispersant, the parting effect of the parting agent may not be generated.

To resolve these problems, the added amount of the parting agent is restricted in the range of 0.1 to 10.0 wt %. The parting agent has a number average molecular weight of from 1,000 to 6,000. If the number average molecular weight is over 6,000, the physical property of the image composition is lowered and thereby a rigid printing image may not be formed. Also, when the number average molecular weight is less than 1,000, the parting effect of the parting agent may be degenerated and thereby the fixation of the image composition may be lowered.

To resolve these problems, the number average molecular weight of the parting agent is restricted in the range of 0.1 to 10.0 wt %. After the dispersion process of the hydromorphic dispersant to which the suspension stabilizer, the polymerization initiator, the polysulfurnitride derivative, the monomer and the parting agent are added is completed to a degree, the hydromorphic dispersant is loaded in a high temperature chamber having nitrogen atmosphere. The hydromorphic dispersant is maintained at a temperature of 50° C. and simultaneously is agitated in a velocity of 300 rpm in the chamber. During the heating and agitating process, the monomer causes a series of polymerization reactions with the polymerization initiator as the medium and thereby the thermoplastic resin is finally formed. Afterwards, the finally formed thermoplastic resin that is a monomer is mixed with the polysulfurnitride derivative and the mixture is dried. After the drying step is completed, remaining hydromorphic dispersant is removed from the dried mixture. As a result, the metallic gloss image composition is finally fabricated.

In the above process, after the drying step is completed, an external additive agent can be further added to the dried polysulfurnitride derivative and the monomer. The external additive agent in advance prevents the dried image composition from being aggregated. As the external additive agent, a hydrophobic silica can be selected. The hydrophobic silica includes HDK H-2000 made in Water Chemicals East Asia Limited, CARBO-SIL TS-720 made in Carbot Corporation and CARBO-SIL TS-720 made in Carbot Corporation.

The following table 3 shows one example of the image composition according to the second embodiment.

TABLE 3

| Constituent | Added amount 1 | Added amount 2 | Added amount 3 | Added amount 4 |
| --- | --- | --- | --- | --- |
| Polysulfurnitride derivative | 5 g | 10 g | 40 g | 70 g |
| Styrene | 140 ml | 140 ml | 140 ml | 140 ml |
| Butyl methacrylate | 60 ml | 60 ml | 60 ml | |
| Barium sulfate | 1 g | 1 g | 1 g | 1 g |
| Potassium sulfate | 2 g | 2 g | 2 g | 2 g |
| Polyethylene | 1.5 g | 1.5 g | 1.5 g | 1.5 g |
| Water | 600 ml | 600 ml | 600 ml | 600 ml |

As previously described, the polysulfurnitride derivative shown in the table 3 acts as the metallic gloss provider providing the printed image with the metallic gloss and has an added amount in a range of 1.0 to 10.0 wt %, for example, 5 g to 70 g. Also, the styrene that is one of the styrenic compound monomer and the butyl methacrylate that is one of the methacrylic acid derivative monomer perform a role forming the thermoplastic resin by a series of polymerization reaction and have an added amount in a range of 15 to 30 wt %. The values of 140 ml and 60 ml are within such the range. The barium sulfate that is one kind of the suspension stabilizer is used for allowing the thermoplastic resin formed by the polymerization of the monomers to be smoothly dispersed in the hydromorphic dispersant and has an added amount in a range of 0.1 to 2.0 wt %. In table 3, 1 g is added in respective cases. The potassium sulfate which is one kind of the persulfates compound polymerization initiator helps to start the polymerization reaction of the monomers and has an added amount in a range of 0.1 to 5.0 wt %, for example, 2 g. The polyethylene which is one kind of the parting agent allows the finally formed image composition to be rapidly fixed to the printing paper and has an added amount in a range of 0.1 to 10.0 wt %, for example, 1 g.

The following table 4 shows measured results of characteristics of the image compositions having the compositions of the table 3. In table 4, comp. 1 designates an image composition having the added amount 1, comp. 2 designates an image composition having the added amount 2, comp. 3 designates an image composition having the added amount 3 and comp. 4 designates an image composition having the added amount 4 in table 2.

TABLE 4

| Items | Comp. 1 | Comp. 2 | Comp. 3 | Comp. 4 |
|---|---|---|---|---|
| Average particle diameter ($\mu$m) | 6.45 | 6.37 | 6.68 | 6.49 |
| Uniformity | 30–40% | 50% and more | 50% and more | 50% and more |
| Optical density | 0.9–1.0 | 1.0 and more | 1.0 and more | 1.0 and more |
| Gloss degree | 35–70 Gross | 70 Gross | 70 Gross | 70 Gross |
| Fixation temperature | 120–140° C. | 120–140° C. | 120–140° C. | 120–140° C. |
| Storage stability | Aggregation rate is less than 5 wt % | Aggregation rate is less than 5 wt % | Aggregation rate is less than 5 wt % | Aggregation rate is less than 5 wt % |

To measure the average particle diameter and uniformity of the image composition formed by the embodiment 2, Mastersizer microplus that is one kind of the laser particle size analyzing apparatus made in Malvern company was used. Referring again to table 4, the image compositions in which the added amounts of the polysulfurnitride derivative are different from each other maintained a normal average diameter in a range of 6.37 to 6.68 $\mu$m. Based on the analysis results, percentage of particles having an average particle diameter of ±2.50 $\mu$m was examined. Each of the image compositions is in a range of 30 to 50%. And, it is confirmed that each of the image compositions of the present invention has a superior uniformity on the whole.

Next, to measure the optical density, the finally formed image composition is analyzed using TR-1224 that is one kind of the optical density measuring apparatus made in Mecbeth Company. As shown in the table 4, each of the image compositions maintains a superior optical density of 0.9 and more.

Next, to measure the gloss degree, the finally formed image composition is analyzed using Triple angle glossmeter that is one kind of the gloss degree measuring apparatus made in Mecbeth company. At this time, the measuring angle is maintained at 60 degree. As is shown in the table 4, each of the image compositions maintains a superior gloss degree of about 70 gloss.

Next, to measure the fixing temperature, the peel test was preformed with an image composition printed on printing paper. For the peel test, a scotch mending tape 810-3-18 made in Sumimoto 3M company was used. As shown in the table 4, each of the image compositions maintains a superior fixing temperature range of 0° C. to 140° C.

Next, to measure the storage stability, the image composition according to the second embodiment of the invention was contained in a container having a constant volume of which the inlet was sealed. Thereafter, the sealed container was stored for one week in a water bath. After one week elapses, the image composition was extracted from the container and was then mounted on a screen having a size of 42-mesh. Thereafter, the screen was vibrated for 30 seconds using REOSTAT that is one kind of the particle measuring apparatus made in Hosokawa Micron Company. Afterwards, the weight of the image composition remaining on the screen was measured.

As shown in the table 4, each of the image compositions shows a relatively weak aggregation rate less than 5 wt %. Thus, the polysulfurnitride derivative can easily control the particle size in inhomogeneous solvent compared with the conventional metal-containing inorganic pigment. Also, it has a superior dispersion. Therefore, by the use of the polysulfurnitride derivative as a main component in the image composition, good metallic gloss can be provided in the printed image and particle size control and aggregation problems cane be solved.

Moreover, the polysulfurnitride has a relatively smaller contamination degree compared with the conventional metal-containing inorganic pigment. Therefore, by the use of the polysulfurnitride derivative as a main component in the image composition, printed image having the good metallic gloss can be obtained and the contamination of the human body and the environmental pollution can a be prevented.

While specific embodiments of the present invention have been described, various modifications and substitutions will become apparent to one skilled in the art by this disclosure. Such modifications and substitutions are within the scope of the present invention, and are intended to be covered by the appended claims.

What is claimed is:

1. A metallic gloss image composition comprising:
   a hydromorphic solvent; and
   a polysulfurnitride derivative dissolved in the hydromorphic solvent, said polysulfurnitride derivative having the following formula:

$$R^1-(-S=N-)_n-R^2$$

wherein
   each of $R^1$ and $R^2$ is one selected from the group consisting of hydrogen, $C_1$–$C_{30}$ aliphatic compound, $C_1$–$C_{30}$ aliphatic compound having at least one functional group, $C_1$–$C_{30}$ heteroaliphatic compound, $C_1$–$C_{30}$ heteroaliphatic compound having at least one functional group, $C_1$–$C_{30}$ cycloaliphatic compound, $C_1$–$C_{30}$ cycloaliphatic compound having at least one functional group, $C_1$–$C_{30}$ aromatic compound, $C_1$–$C_{30}$ aromatic compound having at least one functional group, polyoxyethylene group, polyoxyethylene having at least one functional group, polyoxypropylene group, polyoxypropylene group having at least one functional group, co polymer of oxyethylene group and oxypropylene group and copolymer of oxyethylene group having at least one functional group and oxypropylene group, said functional group is one selected from the group consisting of amino group, imine group, amidino group, amide group, hydrazine group, hydrazone group, haride group, hydroxy group, nitro group, cyano group, thiocyano group, thiol group, carboxyl group, alkali salt of carboxylic acid, phosphoric acid group and alkali salt of phosphoric acid and n is 40–40,000.

2. The metallic gloss image composition of claim 1, wherein said hydromorphic solvent comprises alcohol compound.

3. The metallic gloss image composition of claim 2, wherein said alcohol compound is one selected from the group consisting of ethanol, isopropanol, butanol and pentanol.

4. The metallic gloss image composition of claim 2, wherein said alcohol compound is about 1.0–20.0 wt %.

5. The metallic gloss image composition of claim 1, wherein said hydromorphic solvent comprises glycol compound hygroscopic agent.

6. The metallic gloss image composition of claim 5, wherein said glycol compound hygroscopic agent is mixed in a content of 0.1 to 20.0% by weight with said hydromorphic solvent.

7. The metallic gloss image composition of claim 5, wherein said glycol compound hygroscopicagent is one selected from the group consisting of ethylene glycol, propylene glycol, 1,3-butanediol, 1,4-butanediol, 1,5-pentanediol, 2-butene-1,4-diol, 2-methyl-2-pentanediol.

8. The metallic gloss image composition of claim 1, wherein said hydromorphic solvent comprises a pyrrolidone compound storage stabilizer.

9. The metallic gloss image compound of claim 8, wherein said pyrrolidone compound storage stabilizer is mixed in a content of 0.1 to 10.0% by weight with the hydromorphic solvent.

10. The metallic gloss image compound of claims 8, wherein said pyrrolidone compound storage stabilizer is 2-pyrrolidone or N-methyl-2-pyrrolidone.

11. The metallic gloss image compound of claim 1, wherein said hydromorphic solvent comprises a polyoxide compound surfactant.

12. The metallic gloss image compound of claim 11, wherein said polyoxide compound surfactant is mixed in a content of 0.1 to 1.0% by weight with said hydromorphic solvent.

13. The metallic gloss image compound of claim 11, wherein said polyoxide compound surfactant is polyethyleneoxide or polypropyleneoxide.

14. The metallic gloss image compound of claim 1, wherein said hydromorphic solvent comprises a viscosity modifier.

15. The metallic gloss image compound of claim 14, wherein said viscosity modifier is mixed in a content of 0.1 to 5.0% by weight with said hydromorphic solvent.

16. The metallic gloss image compound of claim 14, wherein said viscosity modifier is one selected from the group consisting of polyvinylalcohol, casein and carboxymethylcellulose.

17. A metallic gloss image composition comprising:
a thermoplastic resin formed by polymerization of a plurality of monomers; and
a polysulfurnitride derivative mixed with said thermoplastic resin, said polysulfurnitride derivative having the following formula:

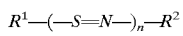

$$R^1-(-S=N-)_n-R^2$$

wherein
each of $R^1$ and $R^2$ is one selected from the group consisting of hydrogen, $C_1$–$C_{30}$ aliphatic compound, $C_1$–$C_{30}$ aliphatic compound having at least one functional group, $C_1$–$C_{30}$ heteroaliphatic compound, $C_1$–C30 heteroaliphatic compound having at least one functional group, $C_1$–$C_{30}$ cycloaliphatic compound, $C_1$–Cqo cycloaliphatic compound having at least one functional group $C_1$–$C_{30}$ aromatic compound, $C_1$–$C_{30}$ aromatic compound having at least one functional group, polyoxyethylene group, polyoxyethylene having at least one functional group, polyoxypropylene group, polyoxypropylene group having at least one functional group, copolymer of oxyethylene group and oxypropylene group and copolymer of oxyethylene group having at least one functional group and oxypropylene group, said functional group is one selected from the group consisting of amino group, imine group, amidino group, amide group, hydrazine group, hydrazone group, haride group, hydroxy group, nitro group, cyano group, thiocyano group, thiol group, carboxyl group, alkali salt of carboxylic acid, phosphoric acid group and alkali salt of phosphoric acid and n is 40-40,000.

18. The metallic gloss image composition of claim 17, wherein said monomer is one selected from the group consisting of styrenic compound monomer, acrylic acid monomer, methacrylic monomer, acrylic acid derivatives monomer, methacrylic acid derivatives monomer, a mixture of styrenic compound monomer and acrylic acid monomer, a mixture of styrenic compound monomer and methacrylic acid monomer, a mixture of styrenic compound monomer and acrylic acid derivatives monomer, a mixture of styrenic compound monomer and methacrylic acid derivatives monomer, a mixture of acrylic acid monomer and methacrylic acid monomer, a mixture of acrylic acid monomer and acrylic acid derivatives monomer, a mixture of acrylic acid monomer and methacrylic acid derivatives monomer, a mixture of methacrylic acid monomer and methacrylic acid derivatives monomer and a mixture of acrylic acid derivatives monomer and methacrylic acid derivatives monomer.

19. The metallic gloss image composition of claim 18, wherein said styrenic compound monomer is one selected from the group consisting of styrene, vinyl toluene and α-methystyrene.

20. The metallic gloss image composition of claim 18, wherein said acrylic acid derivative monomer is one selected from the group consisting of methyl acrylate, ethyl acrylate, propyl acrylate, 2-ethyl hexyl acrylate and dimethyl aminoethyl acrylate.

21. The metallic gloss image composition of claim 18, wherein said methacrylic acid derivatives monomer is one selected from the group consisting of methyl methacrylate, ethyl methacrylate, propyl methacrylate and butyl methacrylate.

22. A method for fabricating a metallic gloss image composition, the method comprising the steps of:
mixing polysulfurnitride derivative, monomer and polymerization initiator with hydromorphic dispersant solvent to form a mixture;
polymerizing said monomer of said mixture using said polymerization initiator; and
drying said polysulfurnitride derivative and said polymerized monomer.

23. The metallic gloss image compound of claim 22, wherein a suspension stabilizer is further mixed with said hydromorphic dispersant solvent in said mixing step.

24. The method of claim 22, wherein said polysulfurnitride derivative is mixed in a content of 1.0 to 10.0% by weight with said hydromorphic solvent.

25. The method of claim 22, wherein said polymerization initiator is mixed in a content of 0.1 to 5.0% by weight with said hydromorphic solvent.

26. The method of claim 22, wherein said polymerization initiator is persulfates compound polymerization initiator or azo compound polymerization initiator.

27. The method of claim 26, wherein said persulfates compound polymerization initiator is potassium persulfate or ammonium persulfate.

28. The method of claim 26, wherein said azo compound polymerization initiator is one selected from the group consisting of 4,4-azobis(4-cyanovaleric acid)), 2,2-azobis (2-amidinopropane) bihydrochloride) and 2,2-azobisisobutylonitrilie.

29. The method of claim 22, wherein parting agent is further mixed with said hydromorphic dispersant solvent in said mixing step.

30. The method of claim 24, wherein said parting agent is mixed in a content of 0.1 to 1.0% by weight with said hydromorphic dispersant solvent.

31. The method of claim 24, wherein said parting agent is one selected from the group consisting of polyethylene, polypropylene, polybutylene and paraffin wax.

32. The method of claim 29, wherein said parting agent has a number average molecular weight of from 1,000 to 6,000.

33. The method of claim 22, wherein said monomer is mixed in a content of 15.0 to 30.0% by weight with said hydromorphic solvent.

34. The method of claim 33, wherein said suspension stabilizer is mixed in a content of 0.1 to 2.0% by weight with said hydromorphic dispersant solvent.

35. The method of claim 33, wherein said suspension stabilizer is one selected from the group consisting of sulfates compound stabilizer, carbonates compound stabilizer, phosphate compound stabilizer, metal oxides compound stabilizer and metal hydroxides compound stabilizer.

36. The method of claim 35, wherein said sulfates compound stabilizer is barium sulfate or calcium sulfate.

37. The method of claim 35, wherein said carbonates compound stabilizer is one selected from the group consisting of barium carbonate, calcium carbonate and magnesium carbonate.

38. The method of claim 35, wherein said phosphates compound stabilizer is calcium phosphate.

39. The method of claim 35, wherein said metal oxides compound stabilizer is aluminum oxide or titanium oxide.

40. The method of claim 35, wherein said metal hydroxides compound stabilizer is one selected from the group consisting of aluminum hydroxide, magnesium hydroxide and ferric hydroxide.

41. The method of claim 22, further comprising the step of adding an external additive agent to said mixture after the drying step is completed.

42. The method of claim 41, wherein said external additive agent is hydrophobic silica.

* * * * *